A. WILLIAMS.
DEVICE FOR MEASURING LIQUID LEVELS.
APPLICATION FILED FEB. 15, 1917.
1,306,453.
Patented June 10, 1919.
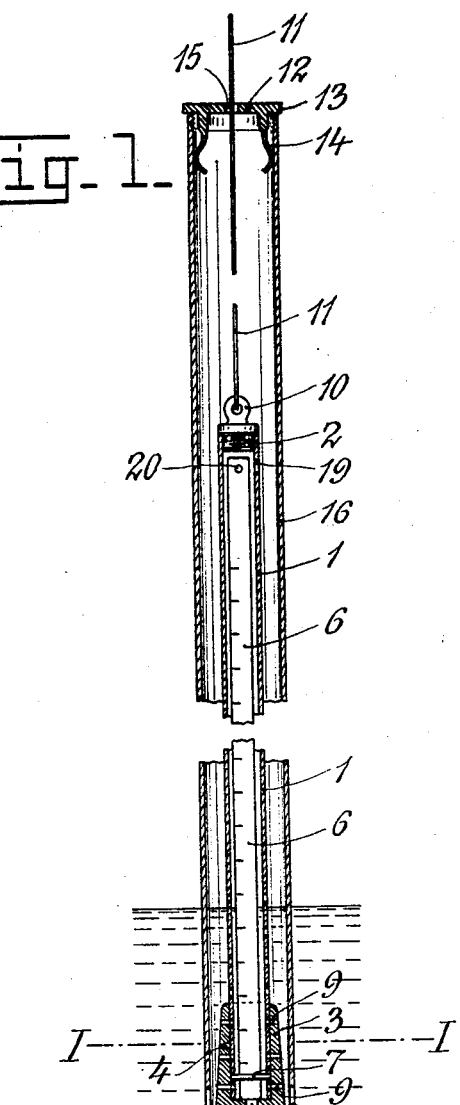
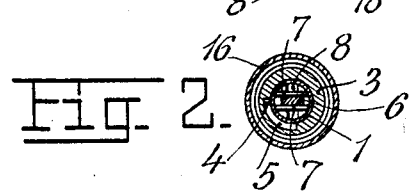
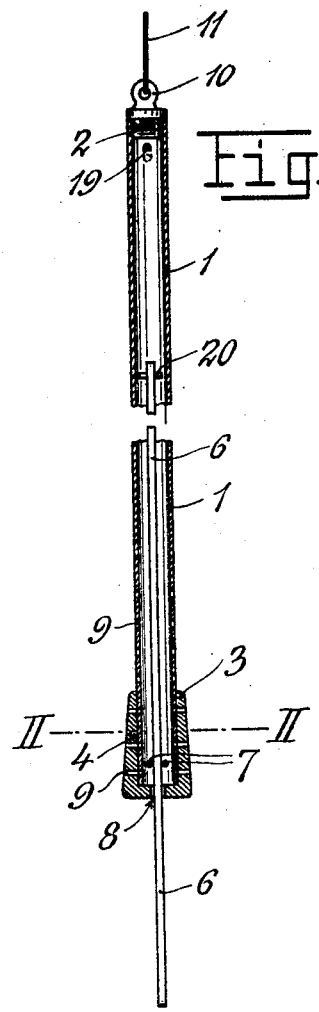
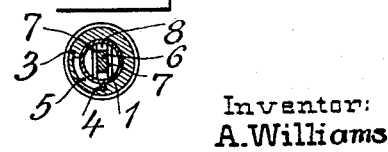
Inventor:
A. Williams
by *Albert Parker*
Attorney

UNITED STATES PATENT OFFICE.

ANDERS WILLIAMS, OF CHRISTIANIA, NORWAY.

DEVICE FOR MEASURING LIQUID-LEVELS.

1,306,453.  Specification of Letters Patent.  Patented June 10, 1919.

Application filed February 15, 1917. Serial No. 148,732.

*To all whom it may concern:*

Be it known that I, ANDERS WILLIAMS, a citizen of Norway, and resident of Prinsens gate 9, in the city of Christiania, Norway, have invented a certain new and useful Device for Measuring Liquid-Levels, of which the following is a specification.

The present invention has for its object to provide an improved device for measuring liquid levels, and more specifically to provide a so-called sounding-rod for measuring the level of eventual water in ship hulls and the like.

The invention is illustrated in the accompanying drawing, as applied to a sounding rod, although it is not of course limited to this application, being applicable to the measuring of liquid levels generally. In these drawings:—

Figure 1 is a vertical longitudinal section of the sounding-rod lowered down into one of the sounding-pipes of the ship.

Fig. 2 is a cross section on the line I—I of Fig. 1.

Fig. 3 is a longitudinal section through the rod, the scale-bar being partly drawn out.

Fig. 4 is a cross section on the line II—II of Fig. 3.

The sounding-rod proper consists of a brass pipe —1—, the upper end of which is closed by a screw stopper —2— and the lower end of which is provided with a cap —3—. The latter is held fast upon the rod by means of a pin —4—, which may be attached to the pipe —1— and for which a groove —5— is made in the cap. The groove has such a peripheral extension that the cap may be rotated through 90 degrees and be stopped by the pin —4— in both end positions. Of course also the pin —4— may be attached to the cap and the groove —5— be formed in the pipe.

Into the pipe —1— is inserted a flat scale-bar —6— having a scale in feet or in meters and which is prevented from turning by means of two cross pins —7— at the lower end of the pipe —1—. A cross pin —20— prevents the bar —6— from being completely removed from the pipe —1—.

In the bottom of the cap —3— is made a rectangular slot —8— of such a size, that the scale-bar —6— may readily pass through it. The slot —8— has such a position in relation to the cross pins —7— and to the two end positions of the cap —3—, that in one of these positions it is across to the pins —7— (Fig. 2) and consequently prevents the scale-bar —6— from passing out, whereas the slot —8— in the other end position of the cap is parallel to and directly beneath the pins —7— (Fig. 4) and enables the pulling-out of the scale-bar (Fig. 3).

Through the cap —3— and the lower part of the pipe —1— are bored some holes —9— at different heights. To the screw stopper —2—, the outer part of which has an eye —10—, is attached a cord —11—, and upon the latter is threaded a guiding ring —12— with an outwardly directed flange —13— and with three or four flexible fingers —14—. The cord —11— runs easily in the hole —15— of the ring —12—. In Fig. 1 the number —16— designates one of the ordinary sounding pipes, which exist in any ship and which extend from the ship bottom —17— (where the pipes have holes or perforations —18—) and up to the deck. Such pipes are usually closed at their upper ends by screw caps (not shown).

When the water level in the hull is to be measured, the said upper screw cap of the sounding-pipe —16— is screwed off, whereupon the sounding-rod —1— is lowered down to the ship bottom by means of the cord —11—. During this operation the guiding ring —12— rests with its flange —13— upon the upper edge of the pipe —16— (Fig. 1) in order to prevent water from coming down through the pipe —16— during such measuring.

When the sounding bar is lowered into the pipe —16—, the water within the latter enters into the pipe —1— and takes the same height as the water level in the hull and in the sounding-pipe —16—. The air in the upper part of the pipe —1— passes out through an inclined hole —19— bored through the upper end of the pipe —1—. When the sounding rod is again hauled up, the cap —3— is turned through 90 degrees and the scale-bar —6— is run out. The scale line up to which the bar —6— has become wet, indicates the water level in the hull.

Having now described my invention, what I claim as new and desire to secure by Letters Patent is:

1. A device for measuring liquid levels, comprising a portable pipe perforated at its lower end to permit ingress and egress of liquid, a scale bar inclosed within said pipe and supported thereby in definite relation to the lower end thereof, said pipe and bar being insertible into and withdrawable from the liquid as a unit, and means normally retaining the scale bar within the pipe but movable to permit withdrawal of said bar from the pipe, for the purpose specified.

2. A device as claimed in claim 1, wherein means are provided at the lower end of the pipe, normally supporting the scale bar and retaining the same within the pipe, said means being rotatable through a predetermined arc into a position in which it permits withdrawal of the scale bar.

3. A device as claimed in claim, 2, wherein the pipe at its lower end has a cap rotatable into two extreme positions, and means are arranged within the pipe to prevent rotation of the scale-bar, the latter in one position of the cap being prevented from running out from the pipe, and in the other position of the cap being removable through a slot formed in the cap bottom.

4. A device as claimed in claim 3, wherein a flat scale-bar is arranged within the pipe, and two cross pins are arranged in the lower part of the pipe one on each side of the bar to prevent rotation thereof.

5. A device as claimed in claim 1, wherein a cord is attached to the upper end of the pipe and a guiding ring running upon said cord is adapted to constitute a removable cover for a ship sounding pipe during the measuring operation.

Signed at Christiania, Norway, this tenth day of January A. D. 1917.

ANDERS WILLIAMS.

Witnesses:
ALEX LAHN,
MAGNUS BUGGE.

Copies of this patent may be obtained for five cents each, by addressing the "Commissioner of Patents, Washington, D. C."